United States Patent [19]

Saito

[11] Patent Number: 4,618,900

[45] Date of Patent: Oct. 21, 1986

[54] MAGNETIC DISK AND SPINDLE FOR DRIVING THE SAME

[75] Inventor: Yukio Saito, Furukawa, Japan

[73] Assignee: Alps Electric Co., Ltd., Japan

[21] Appl. No.: 540,862

[22] Filed: Oct. 11, 1983

[30] Foreign Application Priority Data

Oct. 8, 1982 [JP] Japan .......................... 57-153130[U]

[51] Int. Cl.4 .......................... G11B 5/012; G11B 5/82
[52] U.S. Cl. ....................................... 360/97; 360/135; 403/322
[58] Field of Search .................... 360/97-99, 360/133, 135; 369/270-271, 282, 290; 403/1, 315-316, 322, 332; 285/34; 192/101, 75, 76, 54; 464/104

[56] References Cited

U.S. PATENT DOCUMENTS

| 2,302,503 | 11/1942 | Proctor | 369/271 |
| 2,885,892 | 5/1959 | Lane | 403/322 |
| 4,216,511 | 8/1980 | Bilek | 360/133 |
| 4,521,819 | 6/1985 | Elsing | 360/98 X |

Primary Examiner—A. J. Heinz
Attorney, Agent, or Firm—Guy W. Shoup

[57] ABSTRACT

Disclosed is a magnetic disk comprising a center hub directly/indirectly fixedly attached to a central hole portion of a disk-like magnetic storage medium, a circular center hole formed at a central portion of the center hub for receiving a driving spindle inserted thereinto, and a groove annularly formed in an inner wall of the center hole for receiving portions of members provided at the driving spindle side. The member may preferably be balls. The balls are sandwiched between a center hub bearer rotatably attached on the driving spindle and a ball pressing fixedly provided on the driving spindle.

8 Claims, 9 Drawing Figures

MAGNETIC DISK AND SPINDLE FOR DRIVING THE SAME

BACKGROUND OF THE INVENTION

1. Field of the Invention

The present invention relates to an arrangement of a magnetic disk.

2. Description of the Prior Art

Conventionally, a magnetic disk having a center hub as shown in FIGS. 1 and 2 has been used. Reference numeral 1 designates a disk-like magnetic storage medium, and 2 a center hub fixed to the disk-like magnetic storage medium 1. The storing into and reproducing from the disk-like magnetic storage medium 1 is performed in such a manner that a driving spindle 11 is inserted as shown in FIG. 3 into a circular center hole 2a formed at the central portion of the center hub 2 so as to rotate the center hub 2 to thereb rotate the disk-like magnetic storage medium 1 which is fixed to the center hub 1. However, the cener hole 2a of the center hub 2 of the conventional magnetic disk is cylindrically shaped as shown in FIG. 2 and therefore it is necessary to provide such an arrangement as shown in FIG. 3 in order to fix the magnetic disk to a magnetic storage device. That is, such a mechanism as shown in FIG. 3 is employed, in which the driving spindle 11 is inserted into the center hole 2a of the center hub 2 until an abutment surface 11b of the driving spindle 11 is urged against an under abutment surface 2b of the center hub 2, and, further, a hub pressing 12 is urged downward in the drawing by any means such as a compression spring 14 to thereby urge an abutment surface 12a of the hub pressing 12 against an upper abutment surface 2c of the center hub 2.

In such a conventional fixing mechanism, however, when a magnetic disk is fixed, it is necessary to move the hub pressing 12 upward in the drawing by any means to widen the distance between the hub pressing 12 and the driving spindle 11 to be larger than the thickness of the center hub 2 so as to enable the center hub 2 to be displaced left/right in the drawing to insert the driving spindle 11 into the center hole 2a of the center hub 2, and the hub pressing 12 is moved again downward in the drawing while the driving spindle is being inserted or after it has been inserted into the center hole 2a of the center hub 2, resulting in not only complication in mechanism but worse working property in magnetic disk mounting.

SUMMARY OF THE INVENTION

An object of the present invention is, therefore, to eliminate the disadvantage as mentioned above in the prior art.

Another object of the present invention is to provide a magnetic disk in which when a disk-like magnetic storage medium is fixed to a magnetic strage device for performing a data recording/reproducing operation, the disk-like magnetic storage medium can be surely fixed to the magnetic storage device with a simpler mechanism.

Another object of the present invention is to provide a magnetic disk in which the number of degrees of freedom in mounting directions is increased, and in which the center hub 2 can be surely fixed without using the conventionally used hub pressing 12 for urging the center hub 2.

DETAILED DESCRIPTION OF THE PREFERRED EMBODIMENTS

Referring to FIGS. 4 to 9, preferred embodiments of the present invention will be described hereunder.

Figure 1:
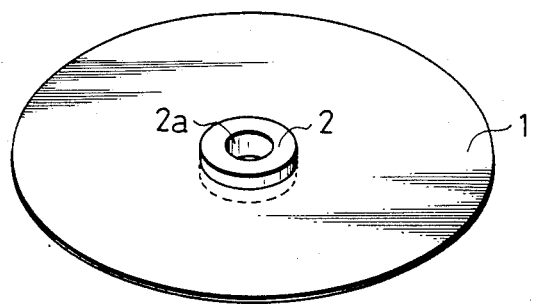
FIG. 1 is a perspective view of the conventional magnetic disk.
Figure 2:
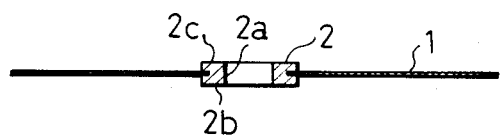
FIG. 2 is a cross-section of the conventional magnetic disk.
Figure 3:
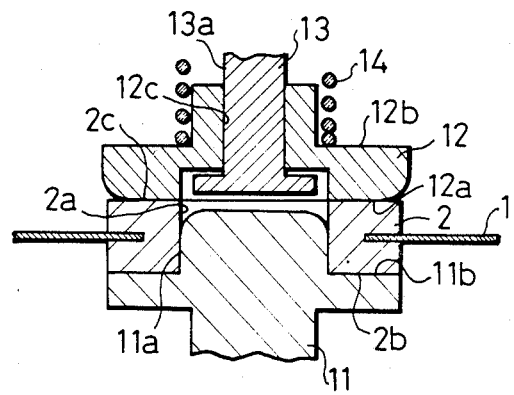
FIG. 3 is a cross-section illustrating the fixing state of the conventional magnetic disk onto the magnetic storage device.
Figure 4:
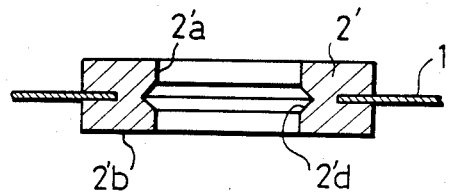
FIGS. 4 to 6 are cross-sections of main portion of the magnetic disk according to various embodiments of the present invention.
Figure 5:
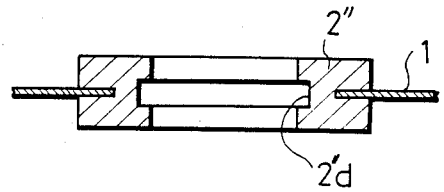
Figure 6:
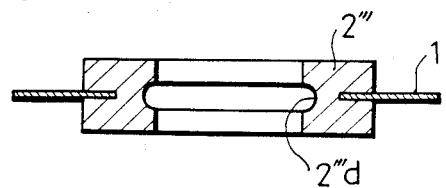

FIGS. 4 to 6 are cross-sections of main portion of the magnetic disk according to various embodiments of the present invention. In FIG. 4, reference numeral 1 designates a disk-like magnetic strage medium; 2', a center hub fixed to the disk-like magnetic strage medium 1; 2a', an inner wall of a center hole of the center hub 2'; and 2d", an annular groove having a V-shaped cross-section and provided in the hole wall 2a' of the center hub 2'. Owing to the provision of the V-shaped groove 2d", a magnetic disk can be surely fixed to a driving spindle without using the conventional hub pressing 12, as described later, and the number of degrees of freedom in mounting operation is also increased.

Figure 7:
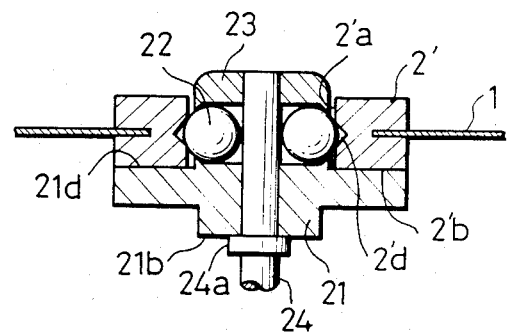
FIG. 7 is a cross-section illustrating the manner of fixing the magnetic disk according to the present invention onto the magnetic strage device.
Figure 8:
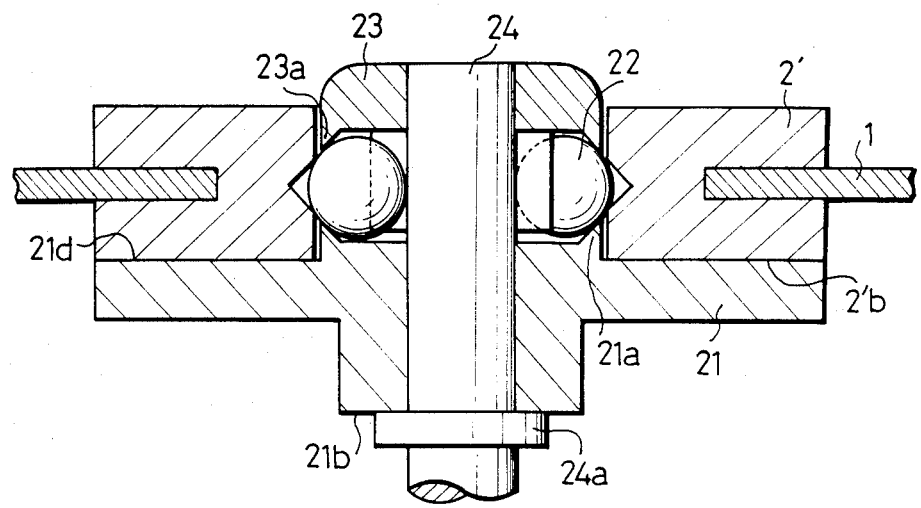
FIG. 8 is an enlarged diagram of FIG. 7.
Figure 9:
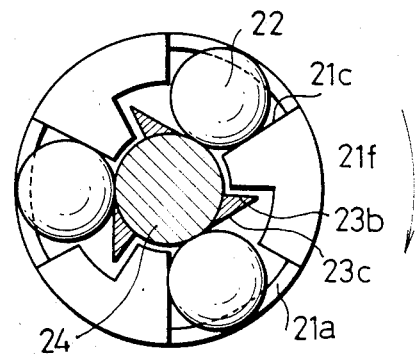
FIG. 9 is a cross-section of the arrangement of FIG. 8 obtained by cutting the same by a plane parallel with the magnetic disk.

The method of fixing the magnetic strage device onto the driving spindle will be now described. FIGS. 7 to 9 illustrate the method of fixing the center hub 2' according to the first embodiment onto the driving spindle, in which FIG. 7 is a cross-section including an axis of rotation of the magnetic disk, FIG. 8 is an enlargement of FIG. 7 and FIG. 9 is a cross-section obtained by cutting FIG. 8 by a plane parallel to the magnetic disk.

In the drawings, a center hub bearer 21 is rotatably mounted onto a driving spindle 24 and limited to move downward from the position as shown in FIG. 8 by the abutment contact of a projected flange-like portion 24a of the driving spindle 24 with the under surface 21b of the center hub bearer 21. Balls 22 are sandwiched between the center hub bearer 21 and a ball pressing 23 fixedly provided on the driving spindle 24 and limited to project exceeding a predetermined amount by projecting portions 21a and 23a of the center hub bearer 21 and the ball pressing 23 respectively as shown in FIG. 8. Further, the center hub bearer 21 and the ball pressing 23 respectively have projecting portions 21f and 23b in the direction perpendicular to the rotation axis, and each projecting portion 21f and each projecting portion 23b respectively have a pushing slanting surface 21c and a guiding slanting surface 23c so as to sandwich each ball 22 therebetween as shown in FIG. 9.

Next, the actuation of this arrangement will be described. In FIG. 9, if the driving spindle 24 is rotated in the direction of arrow, the respective pushing slanting surfaces 23c are also rotated in the direction of arrow to be made in contact with the corresponding balls 22 to thereby move the balls 22 in the direction of arrow. The balls 22 become in contact with the corresponding guiding slanting surfaces 21c and are limited to further move so that the balls 22 are sandwiched between the pushing slanting surfaces 23c and the guiding slanting surfaces 21c correspondingly and urged to move radially outwardly. Even if there is no center hub, the balls 22 become in contact with the ball-projection-preventing projecting portion 21a and 23a correspondingly so that the balls 22 are limited to move radially outwardly exceeding a predetermined amount. Under this condition, if the center hub 2' is moved downwards in FIG. 8, the balls 22 are radially inwardly moved by the hole wall 2a' of the center hub 2'. If the center hub 2' is further moved downward, the under abutment surface 2b' becomes in contact with the abutment surface 21d of the center hub bearer 21 so as to limit the center hub 2' to move downward. The driving spindle 24 continues to rotate under this condition, so that the balls 22 are sandwiched between the pushing slanting surfaces 23c and the guiding slanting surfaces 21c as described above and urged to outwardly move to enter the V-shaped groove 2d' to thereby position the center hub 2' in place so as to cause the center hub 2' to rotate together with the driving spindle 24.

In this arrangement, according to the present invention, the center hub 2' can be surely fixed onto the driving spindle 24 without using any member which has been used for pressing the upper abutment surface of the center hub. Further, since such a member for pressing the center hub from the upper side thereof is not necessary, the number of degrees of freedom in mounting is increased. For instance, it is made possible to mount the magnetic disk onto the driving spindle from the upper side thereof.

FIG. 5 is a second embodiment of the present invention in which an annular groove 2d'' having a U-shaped cross-section is formed in the hole wall of a center hub 2''. The U-shaped groove 2d'' functions in the same manner as the V-shaped groove in the first embodiment.

FIG. 6 is a third embodiment of the present invention in which an annular groove 2d''' having an arc-shaped cross-section is formed in the hole wall of a center hub 2'''. The arc-shaped groove 2d''' functions in the same manner as the V-shaped groove in the first embodiment.

What is claimed is:

1. A magnetic disk, for use in conjunction with a driving spindle having a plurality of members movable upon rotation of said spindle to project circumferentially of said spindle in a plane of rotation of said magnetic disk, comprising:
    a disk-like magnetic storage medium having a center hole;
    a center hub fixedly attached in said center hole of said medium, said hub having a central bore co-axial with the axis of rotation of said disk and being formed by an annular inner wall of a radius for accomodating said spindle; and
    an annular groove formed as a circumferential recess in said inner wall having a depth to another radius relative to said axis of rotation larger than said radius of said inner wall of said center hub for receiving said projecting members upon rotation of said spindle to drive said magnetic disk.

2. A magnetic disk according to claim 1, in which said groove has a V-shaped cross-section.

3. A magnetic disk according to claim 1, in which said groove has a U-shaped cross-section.

4. A magnetic disk according to claim 1, in which said groove has a arc-shaped cross-section.

5. A driving spindle, for use in conjunction with a magnetic disk having a disk-like magnetic storage medium with a center hole, a center hub fixedly attached in said center hole, said hub having a central bore co-axial with an axis of rotation of said disk and being formed by an annular inner wall, and an annular groove formed as a circumferential recess in said inner wall having a depth to a radius relative to said axis of rotation larger than a radius of said inner wall of said center hub, comprising:
    a center hub bearer mounted on a shaft and holding a plurality of members movable radially outwards upon rotation of said spindle to project circumferentially of said spindle into said circumferential recess of said magnetic disk; and
    means for pressing said members to project into said circumferential recess upon rotation of said spindle in order to drive said magnetic disk.

6. A driving spindle according to claim 5, wherein said projecting members are balls, said central hub bearer includes wall portions defining openings for allowing a portion of each of said balls to project therethrough, and said pressing means include ball pressing members fixedly provided on said shaft.

7. A driving spindle according to claim 6, wherein each of said wall portions includes a guiding surface and each of said ball pressing members includes a pushing, slanting surface, respectively, for pushing a corresponding one of said balls to project by a portion thereof through a respective opening in said center hub bearer upon rotation of said spindle.

8. A magnetic disk driving system comprising:
    a magnetic disk composed of a disk-like magnetic storage medium with a center hole, a center hub fixedly attached in said center hole, said hub having a central bore co-axial with an axis of rotation of said disk and being formed by an annular inner wall, and an annular groove formed as a circumferential recess in said inner wall having a depth to a radius relative to said axis of rotation larger than a radius of said inner wall of said center hub; and
    a driving spindle composed of a center hub bearer mounted to a shaft and being adapted for insertion in said central bore of said hub, said center hub bearer holding a plurality of members movable radially outwards upon rotation of said spindle to project circumferentially of said spindle into said circumferential recess of said magnetic disk, and means for pressing said members to project into said circumferential recess upon rotation of said spindle to drive said magnetic disk.

* * * * *